United States Patent [19]
Lindermann

[11] Patent Number: 5,575,907
[45] Date of Patent: Nov. 19, 1996

[54] PROCESS FOR THE RECOVERY OF RAW MATERIALS FROM PRESORTED COLLECTED WASTE, ESPECIALLY SCRAP ELECTROCHEMICAL BATTERIES AND ACCUMULATORS

[75] Inventor: Walter Lindermann, Siblingen, Switzerland

[73] Assignee: Batenus Umwelt - Und Recyclingtechnologie GmbH & Co. KG, Stuhlingen, Germany

[21] Appl. No.: 374,780
[22] PCT Filed: Jul. 19, 1993
[86] PCT No.: PCT/DE93/00644
 § 371 Date: Mar. 27, 1995
 § 102(e) Date: Mar. 27, 1995
[87] PCT Pub. No.: WO94/02265
 PCT Pub. Date: Feb. 3, 1994

[30] Foreign Application Priority Data

Jul. 28, 1992 [DE] Germany ............... 42 24 884.1

[51] Int. Cl.⁶ .................................................. C22B 7/00
[52] U.S. Cl. .............. 205/580; 205/583; 205/589; 205/604; 205/607; 205/540; 241/23; 241/24.11; 241/24.12; 75/401; 75/403; 75/743; 423/100
[58] Field of Search ........................ 204/119, 114, 204/112, 106, 105 R; 423/100; 75/711, 743, 401, 403; 241/23, 24; 205/580, 583, 589, 604, 607, 540

[56] References Cited

U.S. PATENT DOCUMENTS

| | | | |
|---|---|---|---|
| 3,666,185 | 5/1972 | Williams | 241/17 |
| 4,460,442 | 7/1984 | Ducati | 204/114 |
| 5,139,203 | 8/1992 | Alavi | 241/20 |
| 5,248,342 | 9/1993 | Montgomery | 134/7 |
| 5,407,463 | 4/1995 | van Erkel | 75/739 |

FOREIGN PATENT DOCUMENTS

| | | | |
|---|---|---|---|
| 0425045 | 5/1991 | European Pat. Off. | H01M 6/52 |
| 0433654 | 6/1991 | European Pat. Off. | H01M 10/54 |
| 2609651 | 7/1988 | France | B09B 3/00 |

OTHER PUBLICATIONS

*Chemical Abstracts*, vol. 106, No. 16, Apr. 20, 1987, Aoki, et al. "Recovery of Metals from Spent Dry Batteries" p. 239, column 2, summary number 123550u.
Jpn Kokai Tokkyo Koho JP 61,261,443 (86 261 443).

*Primary Examiner*—John Niebling
*Assistant Examiner*—Brendan Mee
*Attorney, Agent, or Firm*—Dick and Harris

[57] ABSTRACT

The invention relates to a process for the recovery of raw materials from presorted collected waste, especially scrap electrochemical batteries and accumulators in which the scrap (10) is first mechanically prepared and divided into coarse and fine fractions (15, 16) which are further processed separately. Materials to be recovered are extracted by dissolution in steps by a first and a second solvent in a wet chemical preparation process from the fine fraction and then recovered individually from the two solutions.

61 Claims, 7 Drawing Sheets

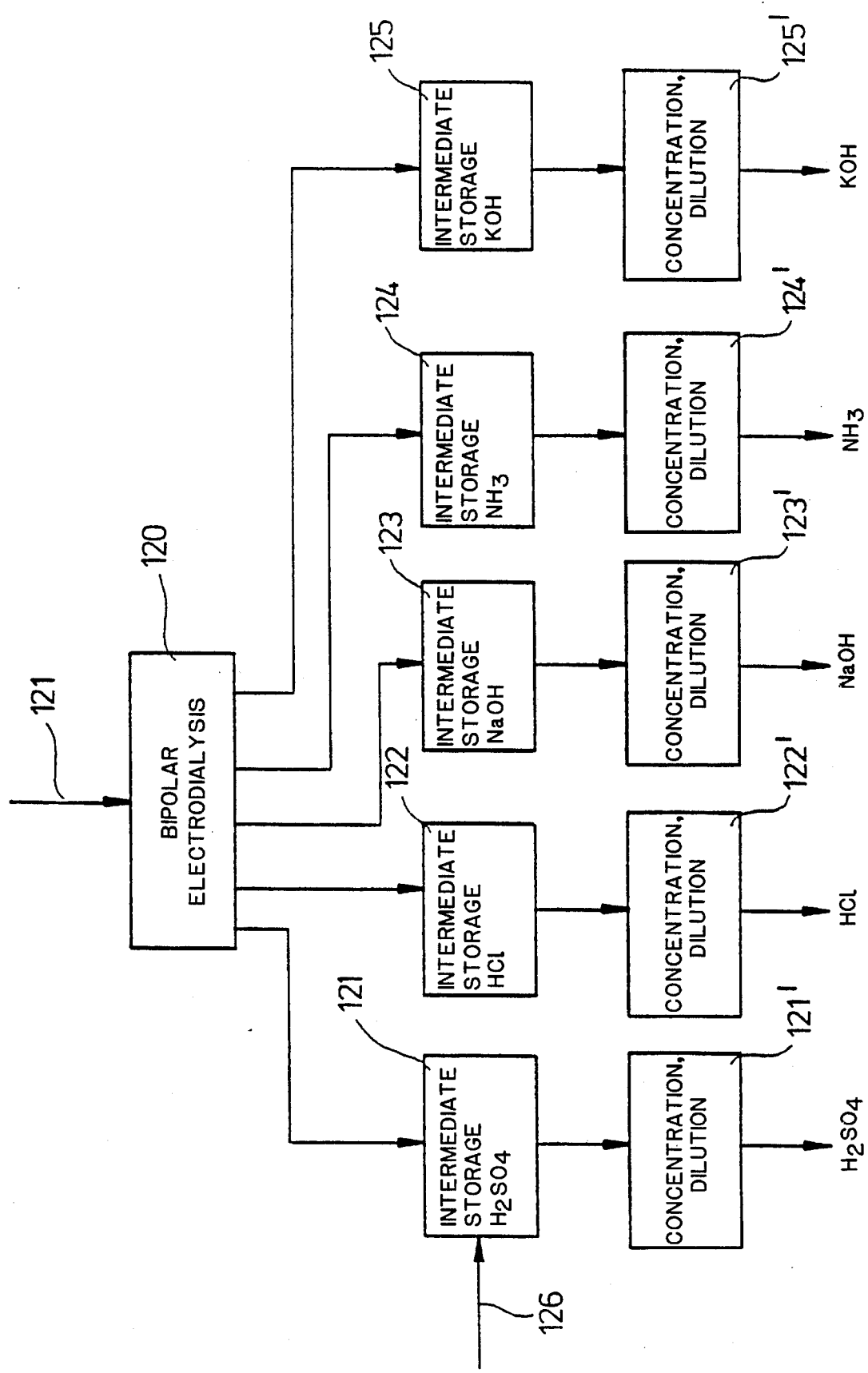

PROCESS FOR THE RECOVERY OF RAW MATERIALS FROM PRESORTED COLLECTED WASTE, ESPECIALLY SCRAP ELECTROCHEMICAL BATTERIES AND ACCUMULATORS

This invention concerns a process for recovering raw materials from presorted collected waste materials, especially from scrap electrochemical batteries and accumulators.

We can no longer imagine daily life without electrochemical batteries as a practical and highly mobile source of energy, because there has been a steady increase in the use of portable electronic equipment. Along with the increase in use of such portable electronic equipment, there has also been an increase in the consumption of batteries, so there are growing numbers of old spent batteries that must be disposed of or sent for recycling.

The most commonly used batteries are zinc-carbon and alkali-manganese batteries. In addition, rechargeable nickel-cadmium batteries are also being used to an increasing extent. Furthermore, mercury button batteries are also used in cases where especially compact energy sources are needed, such as in watches and photographic equipment.

In addition to valuable materials such as nickel and cadmium, these batteries also contain toxic substances such as mercury that must not be allowed to enter the environment.

In order to prevent toxic mercury from entering the garbage, the industry has been trying for some time now to reduce the amount of mercury in batteries. Although considerable progress has already been made in this regard, zinc-carbon and alkali-manganese batteries in particular still contain small amounts of mercury, but even these quantities add up to be a substantial amount in view of the large number of batteries consumed today. Thus, approximately 1.5 tons of mercury are dumped in the garbage each year from the annual battery consumption amounting to approx. 230 million zinc-carbon batteries and approx. 200 million alkali-manganese batteries each year.

In addition to this environmental safety aspect, however, it would also appear expedient not to simply dump the valuable substances contained in batteries in the garbage but to recover them, so these valuable substances can be reused in production processes in a suitable manner.

Although lead batteries such as those used in motor vehicles and the nickel-cadmium batteries that are used industrially are already being recycled almost completely, there is not yet a suitable method of recovering the raw materials present in household batteries.

At the Seventh International Technical Symposium "Battery Disposal and Battery Recycling" of the Industrial Battery Association in ZVEI in March 1991 in Munich, a recycling method for nickel-cadmium batteries based on a wet chemical process was presented. For this recycling process, first the nickel-cadmium batteries must be sorted out of the collected used batteries. Then the batteries are shredded. In a pretreatment, scrap and plastics are recovered from the shredded battery materials and washed with hydrochloric acid. The remaining battery materials are leached out, using the same hydrochloric acid solution as that used to wash the shredded battery materials and then sent to this process step. After filtering, the solution obtained from leaching is sent for wet-chemical work-up, where the nickel and cadmium are also separated by electrolysis.

A disadvantage of this known process is that only nickel-cadmium batteries can be used, which necessitates a complicated (and expensive) sorting operation for the collected batteries.

In a recycling process for Leclanché cells (zinc-carbon and alkali-manganese batteries) that was presented at the same symposium, first the nickel-cadmium batteries are sorted out of the collected batteries. After opening and separating the steel casings, mercury is evaporated at 400° C. to 600° C. in a rotary drum-type kiln, while the distillation residues are sent to a cooling drum to recover the mercury. The remaining material is first crushed in order to then retrieve the iron by means of magnetic separation. There remains a mixture of zinc and manganese that cannot be reused in this form, however.

A disadvantage of this process is that the problem of recovering zinc and manganese from the mixture of zinc and manganese and the correct method of sorting the old batteries has not yet been solved.

At the present time, recycling of household batteries is impossible without special sorting. Therefore, it was recommended at the above-mentioned symposium that used household batteries (with the exception of used accumulators//batteries) should be simply discarded with the household garbage and not collected, because collected batteries must otherwise be disposed of as a special waste and cannot be recycled.

Against this background, this invention is based on the problem of creating a process of the type described initially that will make it possible in particular to recover the valuable materials or raw materials in an economically usable form from an unsorted mixture of used batteries.

This problem is solved according to this invention by the process according to claim 1.

Thus, according to this invention the collected used batteries are first separated mechanically into a coarse fraction and a fine fraction, the latter of which contains essentially the electrolyte material of the batteries. Then the substances to be recovered are dissolved out of the fine fraction step by step using a first and second solution and then recovered from these two solutions.

In this way it is possible to process a mixture of a wide variety of electrolytes from different batteries in such a way that the raw materials contained in them are recovered in a good marketable form.

In particular, the process according to this invention makes it possible to recycle battery raw materials without having to presort them in an expensive process. Thus, this process is especially suitable for recycling used household batteries which can thus be collected by the consumer without sorting them and can be sent for recycling.

According to patent claim 2, foreign materials are sorted out of the collected materials—in other words, the collected used batteries—before the batteries are embrittled by cooling. In particular, mercury button cells can be sorted out and sent for external recovery of mercury.

Mercury button cells can be sorted out easily because they differ significantly in size and shape from the remaining batteries.

Practical embodiments of this invention are described in patent claims 3 to 6.

In addition to the desired embrittlement of the material to be processed, cooling the used batteries to very low temperatures by means of liquid nitrogen according to this invention offers the advantage that the vapor pressures of the individual electrolyte materials are significantly reduced, so that practically no toxic substances such as mercury can be released in the form of exhaust gases. In addition, the liquid nitrogen that evaporates in cooling creates a protective gas atmosphere that permits safe processing. Another advantage of cooling with liquid nitrogen is that even incompletely discharged batteries entering the collection of used batteries cannot lead to inert reactions in mechanical processing.

The mechanically processed material can be divided into a coarse fraction and a fine fraction by sorting in an especially simple manner according to patent claim 7.

The coarse fraction is washed according to patent claim 8 in order to be able to reuse the electrolyte substances adhering to the battery casings that enter the coarse fraction.

The remaining separation of the coarse fraction into marketable raw materials is performed according to patent claims 9 and 10.

The embodiments of this invention according to patent claims 11 and 12 permit an especially good solution to processing the fine fraction.

An especially advantageous embodiment of this invention is described in patent claim 13. According to patent claim 14, sulfur dioxide is preferably added to the sulfuric acid that serves as the second solvent in order to dissolve the otherwise insoluble manganese dioxide and allow it to be sent for recovery.

Consequently, practically only the graphite present in the electrolyte material of the batteries is left in the form of insoluble solids that are of such a high purity that they can be marketed economically. The other valuable materials, especially heavy metals, are then dissolved and can be separated individually from the solution.

It is essential here for the mercury ions to be separated first from both solutions according to patent claim 15 so they cannot have a negative effect on the other separation steps for the other heavy metal ions.

Other advantageous embodiments of this invention are described in patent claims 16 to 32.

It is especially expedient if the individual heavy metal ions are recovered in the order given in patent claim 33 before $MnO_2$ is separated by electrolysis because this minimizes the mutual influence of the heavy metal ions on the individual separation steps.

The process according to this invention thus works with purely hydrometallurgical process steps for processing the electrolyte material from the batteries and it makes it possible to recover the individual raw materials with a high purity, thus making it possible to recycle them directly back to the production process.

Furthermore, the process according to this invention can be carried out independently of the location, because there are no thermal emissions and the process water can be circulated in the process. This is accomplished in particular as a result of the final complete desalination step and the bipolar electrodialysis of the respective fluids.

This invention will be explained in greater detail below with reference to the figures, which show the following:

FIG. 9 shows a schematic diagram of bipolar electrodialysis such as that used together with wet-chemical processing according to FIG. 2.

In the various figures, corresponding process steps and substance streams are labeled with the same numbers as reference.

Figure 1:
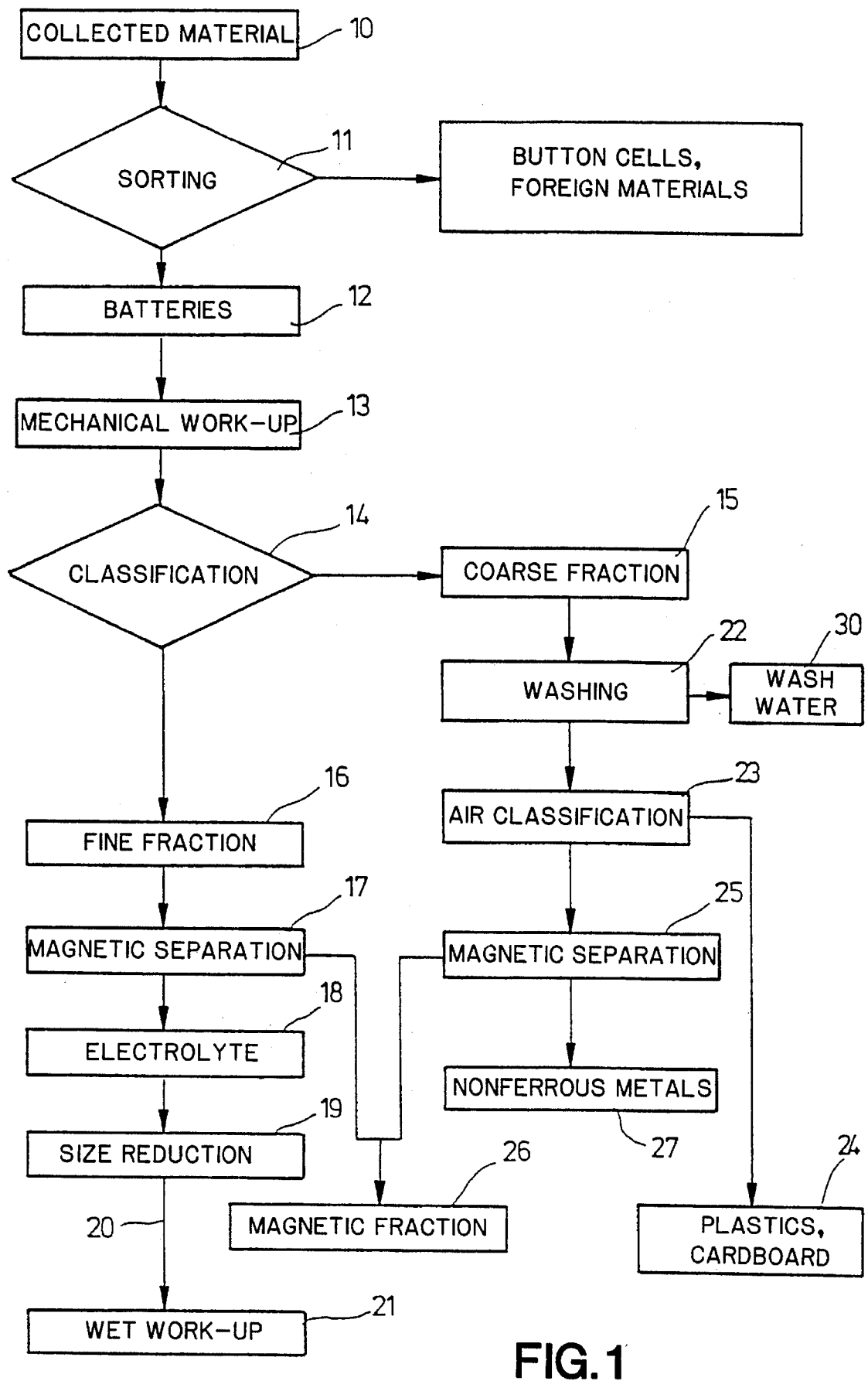
FIG. 1 shows a simplified schematic flow chart of the mechanical processing of the collected material.

Collected material 10 obtained from old spent batteries, such as those used especially in the household, is sent first for sorting 11, so that button batteries which have a very high mercury content as well as other foreign materials can be separated from the batteries 12 that are to be sent for recycling. Thus, most of the mercury is removed from the collected material 10 because only a small amount of mercury is present in the remaining batteries 12 that are to be sent for recycling.

The button batteries that have a high mercury content and are separated in this way are sent for separate recovery of the mercury.

The batteries 12 sorted out of the collected material 10 are first cooled to extremely low temperatures in a mechanical processing step 13 and are thus embrittled. Liquid nitrogen is preferably used for this cooling and embrittlement step, so the batteries 12 can be cooled to a temperature between $-200°$ C. and $-100°$ C. The cooled batteries are first shredded and then crushed, for example, so the battery casings and other metallic components of the batteries are separated from the electrolytes—in other words, separated from the electrochemical element.

Like the other mechanical process steps, this mechanical processing 13 is performed without heating the material that is to be processed, which offers the advantage that no hazardous substances can be released as gases from the electrolyte material of the batteries, because at these low temperatures the corresponding vapor pressures of the substances are very low. Use of liquid nitrogen to cool the batteries 12 also has the advantage that the nitrogen forms a protective gas atmosphere in which mechanical separation 13 can take place.

This cooling to very low temperatures also prevents inert reactions of incompletely discharged batteries from taking place.

The shredded and crushed battery material from the mechanical processing step 13 described above is then separated into a coarse fraction or scrap 15 and a fine fraction 16 by screening 14. The coarse fraction 15 includes the battery casings, while the fine fraction 16 consists essentially of the electrolyte. Magnetic metallic components of the fine fraction that are not are removed by screening 14 are then separated from the electrolyte 18 by means of magnetic separation 17 and the electrolyte 18 is then subjected to disintegration 19.

In the disintegration stage 19, the contents of the battery—in other words, the electrolyte 18—is disintegrated into a powder of a defined particle size by a combination of different roll-type crushers and classifiers. This crushed electrolyte powder is then sent to a chemical wet processing stage 21.

The coarse fraction separated by classification 14 is subjected to a scrap scrubbing (washing 22) with deionized water in order to remove the electrolyte material adhering to the battery casings and the other components of coarse fraction 15. Then the washed coarse fraction is freed of the lightweight components such as plastics and cardboard 24 by air classification 23 so that practically only metallic components of the batteries remain in the coarse fraction after the air separation stage. This coarse fraction is then separated by magnetic separation 25 into a magnetic fraction 26 and nonferrous metals 27. The magnetic metals separated from the fine fraction by magnetic separation 17 are also added to magnetic fraction 26.

The battery casings are thus separated into marketable raw materials.

Figure 2:
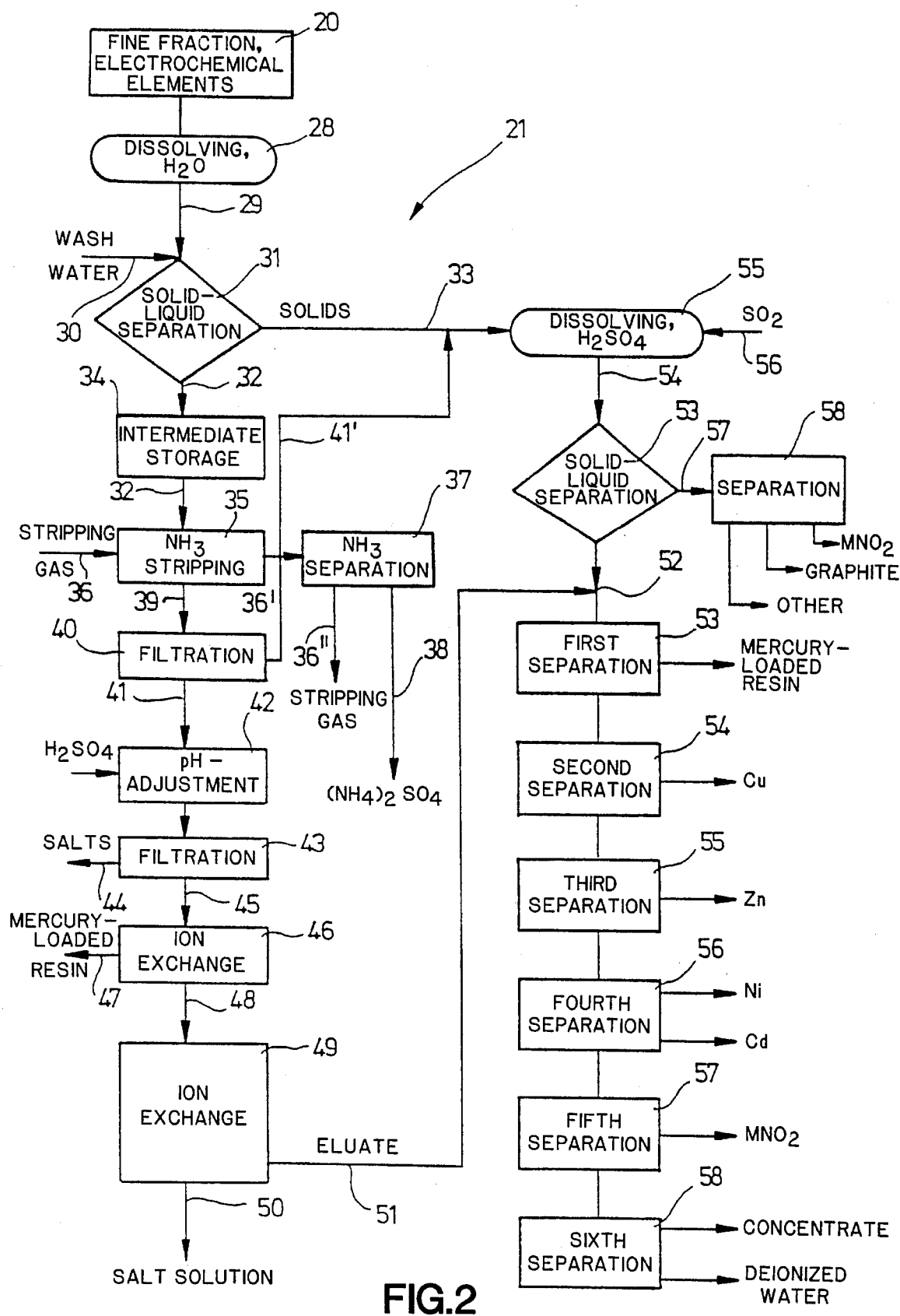
FIG. 2 shows a simplified schematic flow chart of wet-chemical processing of a fine fraction obtained by mechanical processing.

As FIG. 2 shows, the electrolyte powder 20 that has been reduced to a defined particle size is mixed with preferably deionized water in wet chemical processing 21 in order to dissolve 28 the water-soluble substances. This yields a first suspension 29 to which is added the wash water 30 obtained by washing the coarse fraction 15. Then the first suspension 29 is separated into a first solution 32 and non-water-soluble solids 33 in a solid-liquid separation stage 31. The aqueous first solution 32 is then subjected to $NH_3$ stripping 35 after intermediate storage 34 where the fluctuations in concentration are compensated. In the $NH_3$ stripping stage 35 the stripping gas 36 is brought in intimate contact with the aqueous first solution 32. The $NH_3$-enriched stripping gas 36' is then separated from $NH_3$ in an $NH_3$ separation stage 37, forming a clean reusable stripping gas 36" and ammonium sulfate 38.

Salts precipitated from the solution 39 obtained after $NH_3$ stripping are separated by filtration 40 and added to the solids 33 in the form of substance stream 41'.

Filtration 40 yields an $NH_3$-free solution 41 that is subjected to another filtration 43 after a pH adjustment 42 by means of an acid, preferably sulfuric acid.

The salts 44 filtered out by filtration 43 are removed and preferably subjected to bipolar electrodialysis.

The solution 45 obtained after filtration is free of $NH_3$ and solids and has the proper pH to be selectively freed of mercury 47 in the following ion exchange step 46. The Hg-free solution 48 is freed of the remaining cations in another ion exchange process 49. The ion exchange process 49 to which wash water and regeneration solution are added in the usual manner (not shown here for the sake of simplicity) yields a salt solution 50 that includes the chloride salts of unexchanged alkali metals and also an eluate 51 containing mainly heavy metal sulfates. Salt solution 50 is separated by bipolar electrodialysis into the conjugated acid and base.

The eluate 51 is added to a second solution 52 that is obtained by a second solid-liquid separation 53 of a second suspension which is prepared by dissolving 55 the solids 33 and the salts that are filtered out by filtration 40.

Dissolving 55 of the solids 33 and the salts 41 preferably takes place in two steps with sulfuric acid, where sulfur dioxide 56 is introduced in two dissolving steps in order to dissolve and reduce manganese dioxide.

The solids 57 separated by solid-liquid separation 53 from the acid suspension 54 formed by dissolving 55 consist primarily of graphite that is freed of small amounts of other solids by separation 53, thus further increasing the quality of the solids.

The second acidic solution 52 together with the acid eluate 51 is subjected to a first separation 53 to remove mercury, a second separation 54 to remove copper, a third separation 55 to remove zinc, a fourth separation 56 to remove nickel and cadmium, a fifth separation 57 to remove manganese dioxide and a sixth separation 58 to remove a concentrate of the remaining heavy metal ions and to recover water, especially deionized water, and the resulting deionized water is then recycled back to the process.

The individual separation steps are explained in greater detail below with reference to FIGS. 3 to 8.

Figure 3:
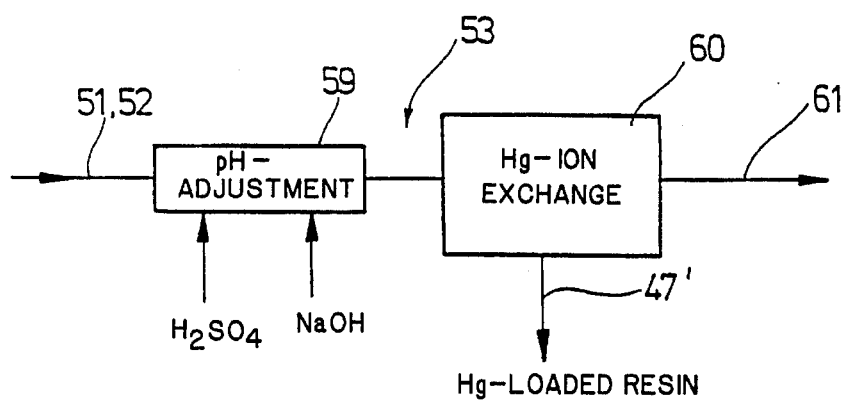
FIGS. 3–8 show simplified schematic flow charts of separation steps 1–6 of wet-chemical processing according to FIG. 2.
Figure 4:
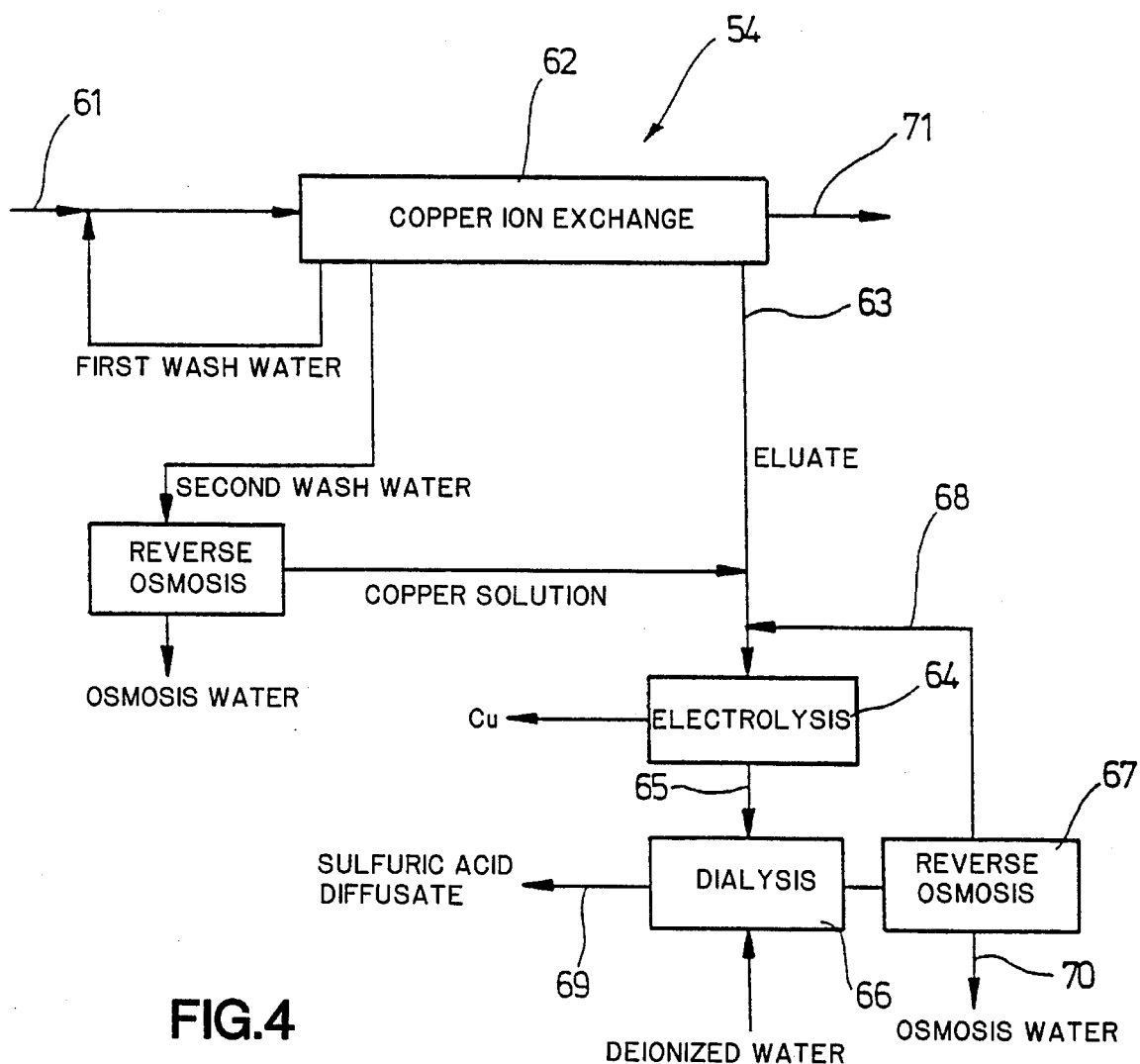

As FIG. 3 shows, the acid solution 52 and the eluate 51 are subjected to a pH adjustment 59 by means of a base and optionally an acid, and then they are sent to an ion exchange process 60 where mercury cations are exchanged selectively. This yields a second solution 61 that is free of mercury.

A cation exchange resin that is selective for mercury is used for the mercury ion exchange step 60 as well as for the mercury ion exchange step 46 and is replenished after its capacity is exhausted. The resin 47 and/or 47' containing mercury is then sent for regeneration or thermal work-up.

The acidic, mercury-free second solution 61 is then sent for copper ion exchange 62 in the second separation stage 54 following a copper ion exchange step 62.

A cation exchanger that selectively exchanges copper ions is used for the copper ion exchange step 62. Regenerating this cation exchanger yields an eluate 63 that is greatly enriched with copper sulfate and from which copper is separated by electrolysis 64. The acidic solution 65 that has a reduced copper sulfate content and is obtained by electrolysis 64 is concentrated by dialysis 66 and a subsequent reverse osmosis 67 to the extent that a copper sulfate solution 68 with a concentration that is suitable for electrolysis 64 is obtained and is sent together with the eluate 63 back to the electrolysis step 64.

This circuit of electrolysis 64, dialysis 66 and reverse osmosis 67 to which deionized water must be added for dialysis 66 yields a diffusate 69 that contains sulfuric acid in addition to the electrolytically deposited copper and osmosis water 70 from reverse osmosis 67. The sulfuric acid diffusate 69 as well as the osmosis water 70 are used further in the process described here.

Figure 5:
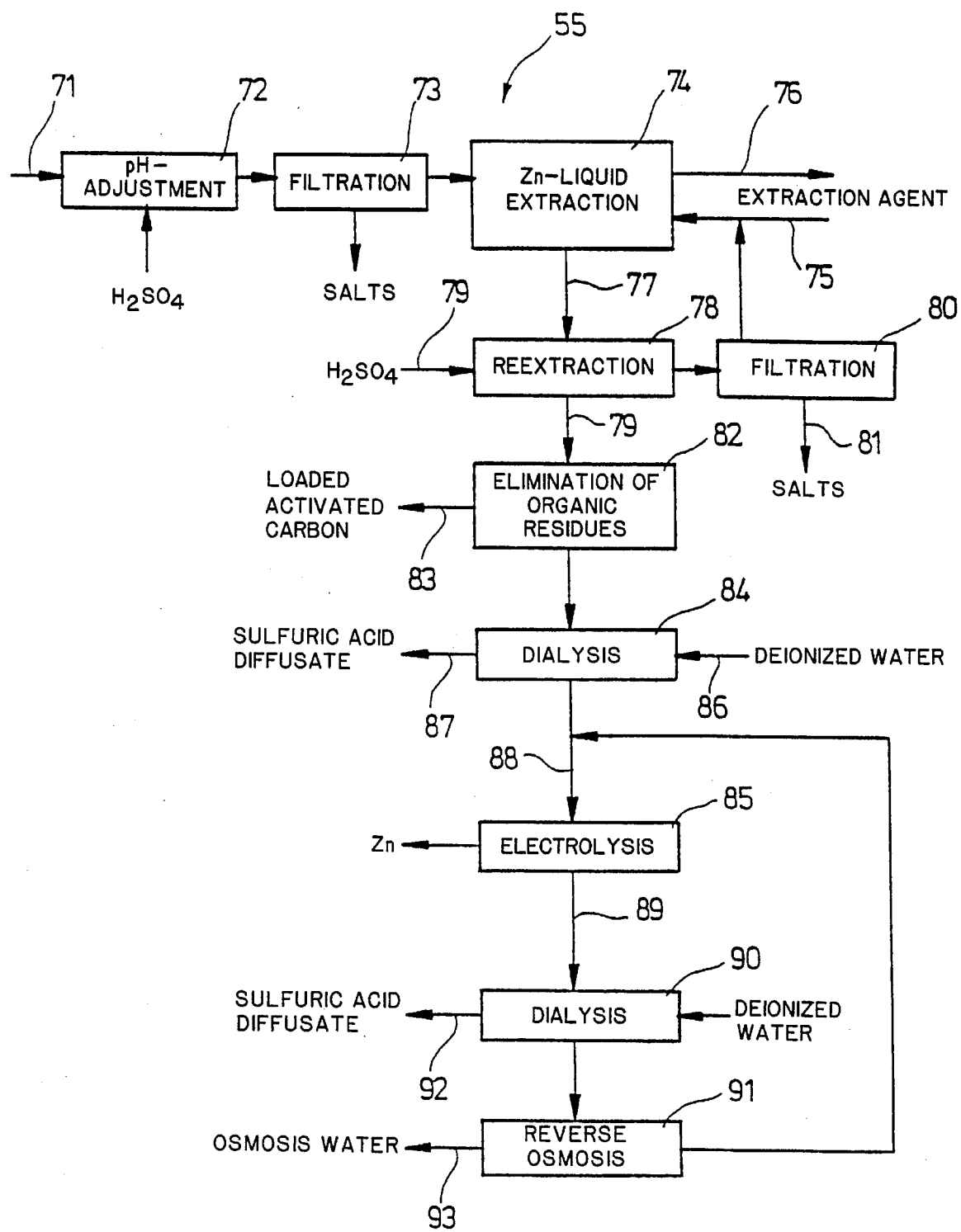

The solution 71 leaving the copper ion exchange step 62 is free of copper and mercury and is sent to the third separation stage 55 that is illustrated in FIG. 5.

After a pH adjustment stage 72 of the solution 71 by means of acid and after filtration 73 where the precipitated salts are separated and sent for bipolar electrodialysis, solution 71 is subjected to liquid-liquid extraction 74. An organic extraction agent 75 is used with a selective phase for liquid-liquid extraction 74 and is fluidized with the solution to be processed in a multi-stage mixer-settler unit, preferably a three-stage mixer-settler unit, where zinc ions are separated from the solution which is then sent as the solution 76 to the fourth separation stage 56 for separating nickel and cadmium.

A zinc-enriched solution 77 obtained by liquid-liquid extraction 74 can be sent back to the liquid-liquid extraction stage 74 by way of filtration 80 to filter out the precipitated salts after reextraction 78 where an acid 78 is used and the zinc ions are converted to an acid solution 79. Solution 79 is sent to electrolysis 85 by way of dialysis 84 after eliminating 82 the organic extraction agent residues, which yields loaded activated carbon 83 that is discharged.

The pH of the solution 88 sent for electrolysis is adjusted in dialysis 84, where deionized water 86 is used and which yields a sulfuric acid diffusate 87.

After separating zinc by electrolysis 85, the solution 89 that contains only a few zinc ions is concentrated further by means of another dialysis step 90 and a reverse osmosis 91 and is sent together with solution 88 from dialysis 84 back for electrolysis 85 again.

This creates an electrolysis circuit 85, 90, 91 which permits continuous operation of electrolysis 85 in an optimum operating range due to an appropriate link-up of dialysis 90 and reverse osmosis 91 with electrolysis 85 for separation of zinc. The sulfuric acid diffusate 92 that is obtained by dialysis 90, the osmosis water 93 that is obtained by reverse osmosis 91 and the sulfuric acid diffusate 87 that is obtained by dialysis 84 are recycled back to the process after an appropriate work-up.

The quality of the zinc obtained by electrolysis 85 is high.

Figure 6:
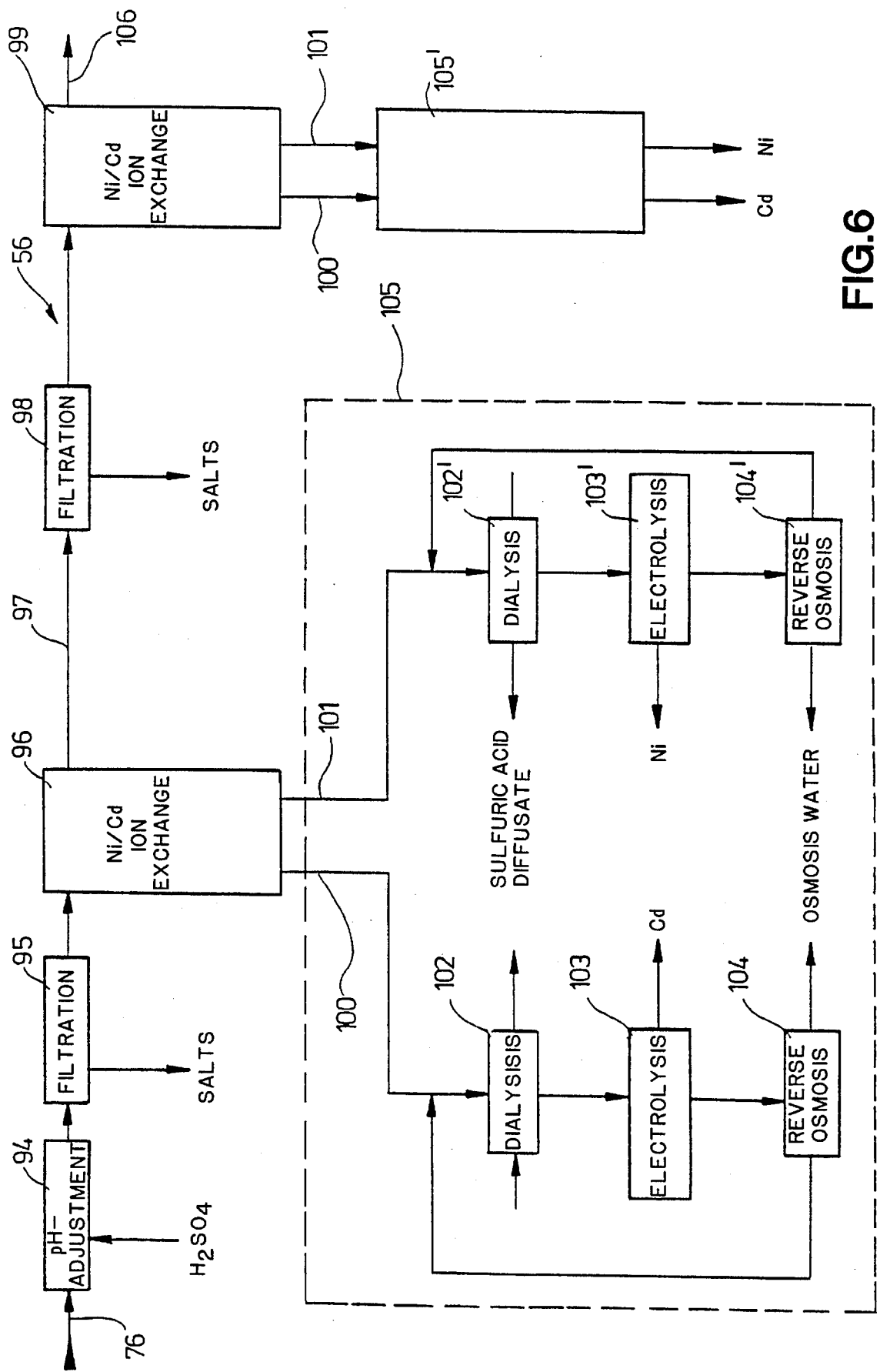

As FIG. 6 shows, the solution 76 which is now free of mercury, copper and zinc is sent to a first ion exchange step 96 for separating nickel and cadmium after a pH adjustment 94 by means of acid and filtration 95 to filter out the precipitated salts. The solution 97 leaving the first ion exchange step 96 then goes through another filtration step 98 for filtering out the precipitated salts and on to a second ion exchange step 99 that is carried out in a manner similar to that used in the first ion exchange step 96 for separating nickel and cadmium. In ion exchange 96 and 99, nickel and cadmium ions are exchanged selectively under suitable process conditions. Regeneration of the ion exchange resin with acid then yields a cadmium-enriched eluate 100 and another eluate 101 that is enriched with nickel. The eluates 100 and 101 are each sent to an electrolysis circuit consisting of dialysis 102, 102', electrolysis 103, 103' and reverse osmosis 104, 104', where cadmium and nickel are deposited electrolytically. The sulfuric acid diffusate formed by dialysis 102, 102' and the osmosis water formed by reverse osmosis 104, 104' are also recycled back to the process.

The electrolysis circuits 102, 103, 104; 102', 103', 104' thus form an Ni/Cd separation stage 105 that is identical to a corresponding Ni/Cd separation stage 105' for the second ion exchange step 99. The fourth separation stage 56 thus forms a multi-stage ion exchange unit for separating nickel and cadmium, where the individual separation stages 96, 105, 99 and 105' are identical in design.

Figure 7:
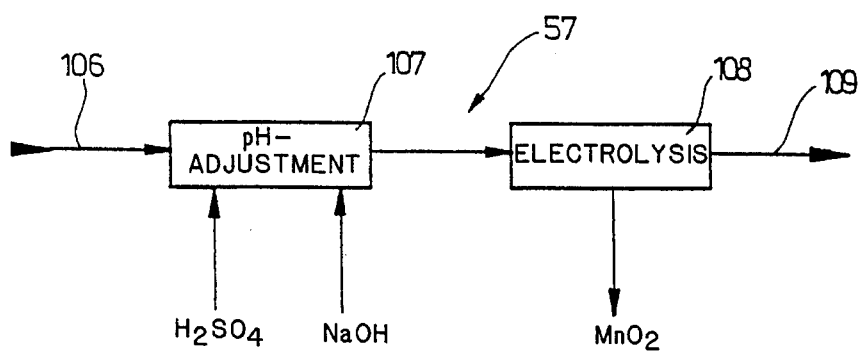
Figure 8:
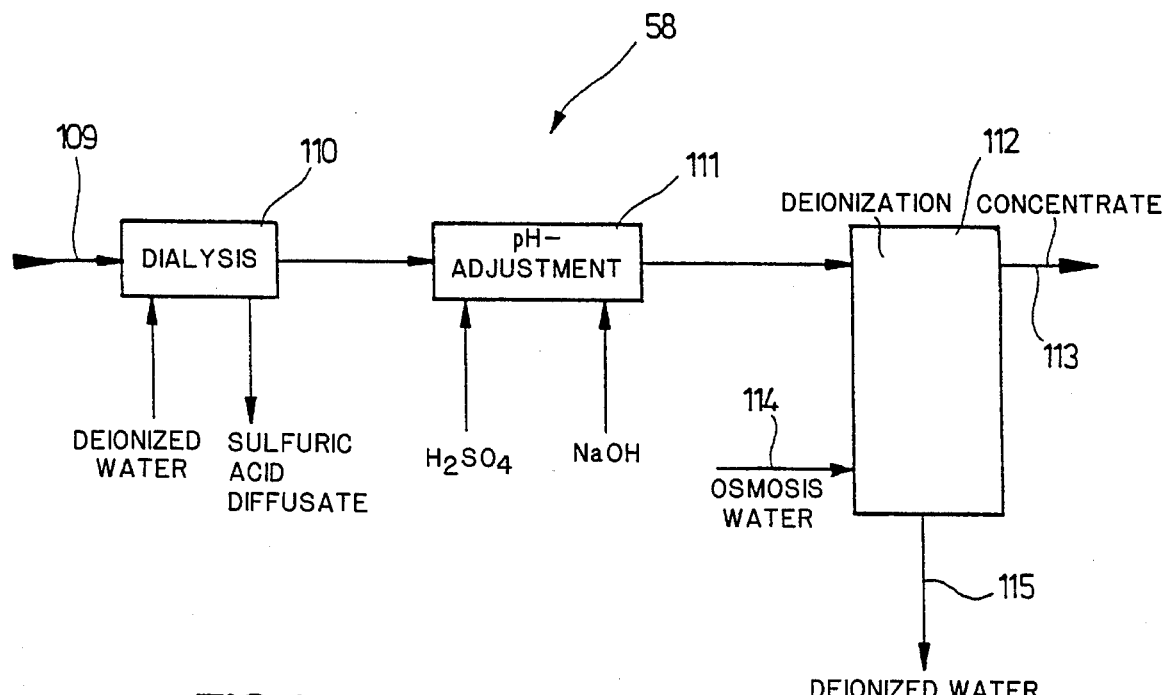

The solution 106 obtained from the fourth separation stage 56 is free of mercury, copper, zinc, nickel and cadmium and is then sent to an electrolysis stage 108 for separating manganese dioxide after a pH adjustment 107 by means of acid and/or base, as illustrated in FIG. 7. Thanks to a suitable process layout, $MnO_2$ (manganese dioxide) is obtained in a very high quality by electrolysis 108. This requires especially that the pH of the solution sent for electrolysis be adjusted to 1.5, for example, and that electrolysis 108 be carried out at a temperature of about 75° C. to 90° C.

The solution 109 leaving the electrolysis stage 108 is free of $MnO_2$, mercury ions, copper ions, nickel ions and cadmium ions and is then sent to the sixth separation stage 58 for work-up of the residual salt burden.

Since solution 109 has only a low residual salt concentration, it is first concentrated by means of dialysis 110 and is sent to the deionization stage 112 after a pH adjustment 111 by means of an acid and/or a base. This deionization 112 is carried out in two stages, where the heavy metal ions remaining in solution are separated in a cation exchanger in a first step while the remaining alkali salts are separated into the conjugated acid and base in a second step by means of electrodialysis with bipolar membranes. Deionization 112 yields first the regeneration solution 113 of the cation exchanger with the concentrate of the remaining heavy metal ions such as iron, aluminum, calcium and magnesium ions and secondly it also yields an acid stream and an acid and base stream (not shown) that can be reused in the process. In addition to the concentrated solution 109' whose pH has been adjusted, the osmosis water 114 from the individual reverse osmosis steps of the process is sent to the deionization stage, which yields deionized water 115 that can be reused in the various process steps of the process described here.

The salts of the individual filtration steps, such as the salt solution leaving the ion exchanger 49 (FIG. 2) and the $(NH_4)_2SO_4$ obtained by $NH_3$ separation are sent by way of the inlet 121 to the bipolar electrodialysis stage 120 that works with bipolar membranes as illustrated in FIG. 9, where they are separated into their conjugated acids and bases. The individual substances are stored in intermediate storage 121, 122, 123, 124 and 125 and can be removed from them by way of appropriate concentration or dilution 121', 122', 123', 124' and 125' in order to be either processed further in the process described here or marketed directly.

The sulfuric acid diffusate obtained in the individual dialysis steps is sent directly to the intermediate storage 121 for sulfuric acid by way of an inlet 126.

Using bipolar electrodialysis 120 in the process described here makes it possible to circulate the acids and bases needed in the process—for adjusting the pH, for example—as well as the deionized water obtained by deionization in the process circuit.

I claim:

1. Process for recovering raw materials from presorted collected waste materials, especially scrap electrochemical batteries and accumulators of different types, whereby the presorted collected waste materials (10) are worked up mechanically and separated into at least one course fraction (115) and at least one fine fraction (16) that are processed further separately, characterized in that the substances to be recovered from the fine fraction (16) in a wet chemical process are dissolved out of the scrap material in stages by using a first and second solvent, resulting in first and second solutions, respectively, and then are recovered individually from the two solutions;

a first suspension (29) and solids (33) that are not soluble in the first solvent are formed from the first solution (32) by adding prior to performing any other dissolving step, a first solvent, namely water, to the fine fraction (20), and the wash water (30) obtained by washing (22) the course fraction (15) is added to this suspension, where the first solution (32) is separated (31) from the insoluble solids (33) of the first suspension, where the solids separated from the first solution are mixed with a second solvent, namely an acid, where a second suspension (54) is formed from a second solution (52) and solids (57) that are not soluble in the second solvent, where the solids (57) are separated from the second suspension (54), and where the two solutions (32, 52) are processed further individually in order to recover the solids dissolved in them.

2. Process according to claim 1, where dilute sulfuric acid is used as the second solvent, to which sulfur dioxide is added, in order to dissolve manganese dioxide ($MnO_2$).

3. Process according to claim 1, where the first solution (32) is stored temporarily (34) after separation (31) from the first suspension (29).

4. Process according to claim 1, where the individual pieces comprising the fine fraction that has been freed of magnetic materials are forcibly reduced in size to yield a powder (20) with a predetermined particle size distribution.

5. Process according to claim 1, where foreign materials are sorted out of the collected materials (10) to yield sorted material, and the sorted material (12) thus obtained is embrittled before the mechanical work-up.

6. Process according to claim 5, where the sorted material (12) is cooled by means of a liquified gas.

7. Process according to claim 5, where the sorted material (12) is cooled to –100° C. to –200° C.

8. Process according to claim 5, where the sorted and embrittled materials are subjected to a mechanical size reduction process.

9. Process according to claim 8, where the sorted and embrittled material is mechanically disintegrated at low temperatures.

10. Process according to claim 1, where the separation into a coarse fraction (15) and a fine fraction (16) is accomplished by classification.

11. Process according to claim 10, where relatively lightweight components such as cardboard and plastic (24) are removed from the coarse fraction by air classification (23).

12. Process according to claim 10, where metallic raw materials (26, 27) are obtained by means of magnetic separation (25) and nonferrous metal separation from the washed course fraction that has been freed of the relatively lightweight components.

13. Process according to claim 10, where magnetic materials, are removed from the fine fraction (16) before wet chemical processing (21) by magnetic separation.

14. Process according to claim 13, where the individual pieces comprising the fine fraction that has been freed of magnetic materials, especially the electrolyte material (18) from electrochemical batteries and accumulators, are forcibly reduced in size to yield a powder (20) with a predetermined particle distribution.

15. Process according to claim 1, where mercury (Hg) ions are separated from each of the first and second solutions (32, 52) by a respective ion exchanger (46, 60) and then other heavy metal ions are separated from each of the first and second solutions in at least one other process step.

16. Process according to claim 15, where the mercury ions separated from the first solution are freed of the remaining cations in a further ion exchanger (49), where chloride salts of the unexchanged alkali metals are separated from heavy metal sulfates which are produced in the ion exchanger as an eluate, and where the chloride salts (50) are sent to a bipolar electrolysis stage (120) while the heavy metal sulfates in the eluate are added to the second solution (52).

17. Process according to claim 15, where the pH of each of the first and second solutions (32, 52) is adjusted before removing the mercury ions.

18. Process according to claim 17, where ammonia ($NH_3$) is separated from the first solution (32) by stripping (35) and any salts which may be present in the first solution are precipitated, and where the precipitated salts are filtered out and added to the solids (33) that have been separated from the first suspension (29).

19. Process according to claim 17, where salts (44) are filtered (43) out of the first solution (32, 41) after adjusting the pH (42) and then are subjected to electrodialysis (120), where the salts (44) are separated into their conjugated acids and basis.

20. Process according to claim 15, wherein after the second solution has been freed of mercury ions, individual heavy metal, especially copper, zinc, nickel and cadmium as well as manganese dioxide are recovered from the second solution in several successive separation stages (54, 55, 56, 57), and where the remaining second solution (109) is then deionized (112).

21. Process according to claim 20, where the second solution (106) that has been freed of mercury, copper, zinc, nickel and cadmium is sent to an electrolysis stage (108) for separation of manganese dioxide ($MnO_2$).

22. Process according to claim 20, where the heavy metals to be recovered are separated from the mercury-free section second solution (61) before manganese dioxide ($MnO_2$) is recovered from it, where first copper and then zinc and next nickel and cadmium are recovered.

23. Process according to claim 20 wherein copper ions present in the remaining second solution are separated, and the pH of the remaining second solution is thereafter adjusted (72, 94, 107, 111) after which a further separation step is performed (55, 56, 57, 58).

24. Process according to claim 23, where the second solution is subjected to filtration (73, 95) after adjusting the pH (72, 94), and where the salts thus separated are sent to the electrodialysis stage (120).

25. Process according to claim 20, where the solution (109) that has been freed of mercury and certain heavy metal ions as well as $MnO_2$ is concentrated by dialysis (110), then its pH is adjusted (111) and it is sent to a deionization stage (112).

26. Process according to claim 25, where the deionization (112) is performed by ion exchange to separate the remaining heavy metal ions and by means of the subsequent electrodialysis with bi-polar membranes to separate the remaining alkali salts into conjugated acid and base.

27. Process according to claim 20, whereby in order to recover the heavy metals, a solution (63, 79, 100, 101) that has been enriched with a certain heavy metal ion is produced in the separation steps (54, 55, 56) and the respective heavy metal is recovered from the solution by electrolysis (64, 85, 103, 103').

28. Process according to claim 27, where the solution leaving electrolysis (64, 85, 103, 103') and containing the respective heavy metal ions in a reduced concentration is concentrated by dialysis (66, 90) and/or reverse osmosis (67, 91, 104, 104') and is sent back to electrolysis (64, 85, 103, 103') together with the solution (63, 68, 100, 101) that has been enriched with heavy metal ions.

29. Process according to claim 27, where the second solution that has been freed of mercury is sent to a selective cation exchanger (62 or 96, 99) to recover copper or nickel and cadmium, yielding a solution (63 or 100 and 101) that is enriched with copper or nickel and cadmium.

30. Process according to claim 29, where the second solution that has been freed of mercury is sent to a two-step cation exchanger (96, 99), comprising a first cation exchanger (96) and a second cation exchanger (99) for separation of nickel and cadmium ions, where the solution (97) leaving the first cation exchanger (96) is filtered before sending it to the second cation exchanger (99) in order to remove the precipitated salts from the solution (97).

31. Process according to claim 27, where the second solution (71) that has been freed of mercury and copper is sent to a liquid-liquid extraction (74) that is carried out in several stages to recover zinc and thereby obtain a solution (77) that is enriched with zinc ions.

32. Process according to claim 31, where the zinc ions are converted to an acid solution (79) by reextraction (78) of the solution (77) that is obtained directly from liquid-liquid extraction (75) and has been enriched with zinc ions, and then after removing (82) the organic residues of the extraction agent (75) and after adjusting the pH by dialysis (84), this solution (79) is sent for electrolysis (85).

33. Process for recovering raw materials from presorted collected waste materials, especially scrap electrochemical batteries and accumulators of different types, whereby the presorted collected waste materials (10) are worked up mechanically and separated into at least one coarse fraction (15) and at least one fine fraction (16) that are processed further separately, characterized in that the substances to be recovered from the fine fraction (16) in a wet chemical process are dissolved out of the scrap material in stages by using first and second solvents, resulting in first and second solutions, respectively, and then are recovered individually from the two solutions;

a first suspension (29) and solids (33) that are not soluble in the first solvent are formed from the first solution (32) by adding a first solvent to the fine fraction (20), and the wash water (30) obtained by washing (22) the coarse fraction (15) is added to this suspension, where the first solution (32) is separated (31) from the insoluble solids (33) of the first suspension, where the solids separated from the first solution are mixed with a second solvent, where a second suspension (54) is formed from a second solutions (52) and solids (57) that are not soluble in the second solvent, where the solids (57) are separated from the second suspension (54), and where the two solutions (32, 52) are further processed individually in order to recover the solids dissolved in them, where dilute sulfuric acid is used as the second solvent, to which sulfur dioxide is added in order to dissolve manganese dioxide ($MnO_2$).

34. Process according to claim 33, where the first solution (32) is stored temporarily (34) after separation (31) from the first suspension (29).

35. Process according to claim 33, where foreign materials are sorted out of the collected materials (10) to yield sorted material, and the sorted material (12) thus obtained is embrittled before the mechanical work-up.

36. Process according to claim 35, where the sorted material (12) is cooled by means of a liquefied gas.

37. Process according to claim 35, where the sorted material 12 is cooled to −100° C. to −200° C.

38. Process according to claim 35, where the sorted and embrittled materials is subjected to a mechanical size reduction process.

39. Process according to claim 38, where the sorted and embrittled material is mechanically disintegrated at low temperatures.

40. Process according to claim 33, where the separation into a coarse fraction (15) and a fine fraction (16) is accomplished by classification.

41. Process according to claim 40, where relatively lightweight components such as cardboard and plastics (24) are removed from the coarse fraction by air classification (23).

42. Process according to claim 40, where metallic raw materials (26, 27) are obtained by means of magnetic separation (25) and nonferrous metal separation from the washed coarse fraction that has been freed of the relatively lightweight components.

43. Process according to claim 40, where magnetic materials are removed from the fine fraction (16) before wet chemical processing (21) by magnetic separation (17).

44. Process according to claim 33, where mercury (Hg) ions are separated from each of the first and second solutions (32, 52) by a respective ion exchanger (46 60) and then other heavy metal ions are separated from each of the first and second solutions in at least one other process step.

45. Process according to claim 44 where ammonia ($NH_3$) is separated from the first solution (32) by stripping (35) and any salts which may be present in the first solution are precipitated, and where the precipitated salts are filtered out and added to the solids (33) that have been separated from the first suspension (29).

46. Process according to claim 44, where the mercury ions separated from the first solution are freed of the remaining cations in an ion exchanger (49), where chloride salts of the unexchanged alkali metals are separated from heavy metal sulfates which are produced in the ion exchanger as an eluate, and where the chloride salts (50) are sent to a bipolar electrodialysis stage (120) while the heavy metal sulfates in the eluate are added to the second solution (52).

47. Process according to claim 44, where the pH of each of the two solutions (32, 52) is adjusted before removing the mercury ions.

48. Process according to claim 47, where salts (44) are filtered (43) out of the first solution (32, 41) after adjusting the pH (42) and then are subjected to electrodialysis (120), where the salts (44) are separated into their conjugated acids and bases.

49. Process according to claim 44, wherein after the second solution has been freed of mercury ions, individual heavy metals, especially copper, zinc, nickel and cadmium as well as manganese dioxide are recovered from the second solution in several successive separation stages (54, 55, 56, 57), and where the remaining second solution (109) is then deionized (112).

50. Process according to claim 49, where the second solution (106) that has been freed of mercury, copper, zinc, nickel and cadmium is sent to an electrolysis stage (108) for separation of manganese dioxide ($MnO_2$).

51. Process according to claim 49, where the heavy metals to be recovered are separated from the mercury-free second solution (61) before manganese dioxide ($MnO_2$) is recovered from it, where first copper and then zinc and next nickel and cadmium are recovered.

52. Process according to claim 49, wherein copper ions present in the remaining second solution are separated, and the pH of the remaining second solution is thereafter adjusted (72, 94, 107, 111), after which a further separation step is performed (55, 56, 57, 58).

53. Process according to claim 52, where the second solution is subjected to filtration (73, 95) after adjusting the pH (72, 94), and where the salts thus separated are sent to the bipolar electrodialysis stage (120).

54. Process according to claim 49, where the solution (109) that has been freed of mercury and certain heavy metal ions as well as $MnO_2$ is concentrated by dialysis (110), then its pH is adjusted (111) and it is sent to a deionization stage (112).

55. Process according to claim 54, where the deionization (112) is performed by ion exchange to separate the remaining heavy metal ions and by means of a subsequent electrodialysis with bipolar membranes to separate the remaining alkali salts into conjugated acid and base.

56. Process according to claim 49, whereby in order to recover the heavy metals, a solution (63, 79, 100, 101) that has been enriched with a certain heavy metal ion is produced in the separation steps (54, 55, 56) and the respective heavy metal is recovered from the solution by electrolysis (64, 85, 103, 103').

57. Process according to claim 56, where the solution leaving electrolysis (64, 85, 103, 103') and containing the respective heavy metal ions in a reduced concentration is concentrated by dialysis (66, 90) and/or reverse osmosis (67, 91, 104, 104') and is sent back to electrolysis (64, 85, 103, 103') together with the solution (63, 68, 100, 101) that has been enriched with heavy metal ions.

58. Process according to claim 56, where the second solution that has been freed of mercury is sent to a selective cation exchanger (62 or 96, 99) to recover copper or nickel and cadmium, yielding a solution (63 or 100 and 101) that is enriched with copper or nickel and cadmium.

59. Process according to claim 58, where the second solution that has been freed of mercury is sent to a two-step cation exchanger (96, 99), comprising a first cation exchanger (96) and a second cation exchanger (99) for separation of nickel and cadmium ions, where the solution (97) leaving the first cation exchanger (96) is filtered before sending it to the second cation exchanger (99) in order to remove the precipitated salts from the solution (97).

60. Process according to claim 56, where the second solution (71) that has been freed of mercury and copper is sent to a liquid-liquid extraction (74) that is carried out in several stages to recover zinc and thereby obtain a solution (77) that is enriched with zinc ions.

61. Process according to claim 60, where the zinc ions are converted to an acid solution (79) by reextraction (78) of the solution (77) that is obtained directly from liquid-liquid extraction (75) and has been enriched with zinc ions, and then after removing (82) the organic residues of the extraction agent (75) and after adjusting the pH by dialysis (84), this acid solution (79) is sent for electrolysis (85).

* * * * *

UNITED STATES PATENT AND TRADEMARK OFFICE
CERTIFICATE OF CORRECTION

PATENT NO. : 5,575,907
DATED : Nov. 19, 1996
INVENTOR(S) : Walter Lindermann

It is certified that error appears in the above-indentified patent and that said Letters Patent is hereby corrected as shown below:

Col. 11, Line 1    delete "solutions" and instead insert "solution"

Col. 8, Line 24    after "adding" insert a comma

Col. 9, Line 4     delete "course" and instead insert "coarse"

Signed and Sealed this

Twenty-second Day of December, 1998

*Attest:*

BRUCE LEHMAN

*Attesting Officer*      *Commissioner of Patents and Trademarks*